United States Patent

[11] 3,573,773

[72] Inventor Edward W. O'Hanlon
    Somerville, N.J.
[21] Appl. No. 693,684
[22] Filed Dec. 26, 1967
[45] Patented Apr. 6, 1971
[73] Assignee Applied Electronics Corporation of New Jersey
    Edison, N.J.

[54] READOUT DEVICE
    19 Claims, 6 Drawing Figs.
[52] U.S. Cl. .................................................. 340/188,
    340/190, 340/179, 340/208, 250/227
[51] Int. Cl. .................................................. G08c 9/06
[50] Field of Search .......................................... 340/190,
    188; 250/227

[56] References Cited
    UNITED STATES PATENTS
2,491,591 12/1949 Sweeny et al. ................ 340/190
3,335,367 8/1967 Skooglund et al. ............ 250/227

Primary Examiner—Thomas B. Habecker
Attorneys—Albert C. Johnston, Robert E. Isner, Lewis H. Eslinger and Alvin Sinderbrand ABSTRACT: In a device for reading the position of a meter pointer or other indicator having a reflective portion and moving in a predetermined path, light is directed at such path from one side, for example, through the meter's cover glass, for reflection back through the glass at the position of the pointer, a series of light receiving elements of light transmitting fibers have ends thereof arranged sequentially along the path to selectively receive the light reflected at the position of the pointer and to selectively illuminate photocells to which the other ends of such elements extend, and an electrical characteristic, such as the frequency, of a signal adapted for transmission to a remote station is determined in dependence upon the selective illumination of the photocells and hence according to the position of the pointer.

INVENTOR
EDWARD W. O'HANLON

BY
ATTORNEY

INVENTOR
EDWARD W. O'HANLON
BY

ATTORNEY

INVENTOR
EDWARD W. O'HANLON
BY
ATTORNEY

READOUT DEVICE

This invention relates generally to readout devices for sensing the position of a movable indicator member, such as a meter pointer or the like, and for producing a signal which corresponds to the sensed position and may be conveniently transmitted to a remote location where the movements are to be monitored or recorded.

In previously proposed readout devices having a mechanical, magnetic or electrostatic coupling with the movable pointer or other member for following the movements thereof, such coupling loads the pointer and thereby either affects the position thereof, and hence the accuracy of the indication of the condition or physical phenomenon being metered, or affects the speed with which the pointer is displaced in response to a change in the metered condition.

Accordingly, it is an object of this invention to provide a readout device for sensing or reading the position of a meter pointer or other indicator member movable in a predetermined path and for producing an electrical signal corresponding to the sensed position, without loading such pointer by either a mechanical, magnetic or electrostatic coupling therewith.

Another object to provide a readout device which can be attached to any existing meter without modification of the latter, and which can sense or read the position of the meter pointer through the usual cover glass of the meter so that there is no need to open the meter casing for installation readout device.

Still another object is to provide a readout device which senses or reads the position of a meter pointer through the cover glass of the meter and produces a corresponding electrical signal that can be transmitted to a remote location where pointer movements are to be monitored or recorded, and which still permits the usual direct visual reading of the pointer position at the site of the meter.

A further object is to provide a readout device with relatively simple arrangements by which large numbers of sensed positions of a meter pointer or other movable member may be accurately discriminated from each other to correspondingly determine an electrical characteristic of the output signal from such device.

In accordance with an aspect of this invention, a readout device comprises means, preferably in form of a light source and a series of optical fiber elements simultaneously and equally receiving light from such source, to emit light toward the path of movement of a pointer or other movable indicator member in a pattern that extends along the path, a series of light receiving optical fiber elements having first ends arranged at sequential positions along the path of movement to selectively receive light from the light emitting elements by way of the movable pointer, as by reflection from the latter, when the pointer is at corresponding positions in such path, a number of photocells having the other ends of the light receiving elements extended thereto so as to be selectively illuminated in correspondence with the position of the pointer, and signal producing circuits having the photocells included therein to determine the frequency or other electrical characteristic of the produced signal according to the pointer position.

It is a feature of this invention, particularly in the case of a device for reading, through the cover glass of a meter, the position of the meter pointer moving in a plane parallel to the cover glass between the latter and a dial face, to space apart the ends of the optical fiber elements which respectively emit the light and receive the light reflected by the pointer, so that the distance between such end, in the direction transverse to the path of movement, subtends the angle between the light rays incident to, and reflected from the pointer, whereby to avoid the collection by the light receiving elements of light rays reflected from the dial face.

In accordance with another feature of this invention, the electrical characteristic of the output signal is controlled in accordance with the total effective resistance value of a series string of resistance elements associated with the photocells and each having a diode in parallel therewith, and a source of potential is connected to the junctions between the successive resistance elements through the associated photocells so that, upon illumination of a selected photocell corresponding to the position of the pointer, the potential at the corresponding junction is varied in relation to the potentials at the other junctions to cause current to flow through the diodes which are between such junction of varied potential and an end of the string for effectively eliminating from the total resistance of the string the values of the resistance elements in parallel with the current conducting diodes.

The above, and other objects, features and advantages of this invention, will be apparent in the following detailed description of an illustrative embodiment which is to be read in connection with the accompanying drawings, wherein.

Figure 1:
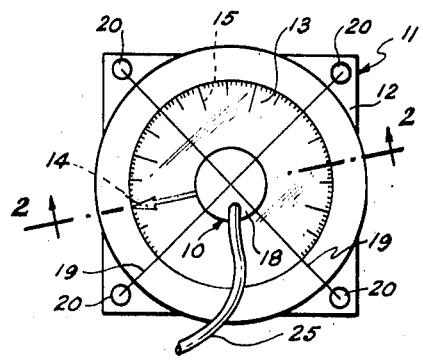
FIG. 1 is a front elevational view of a typical meter having a readout device according to this invention affixed thereto.
Figure 2:
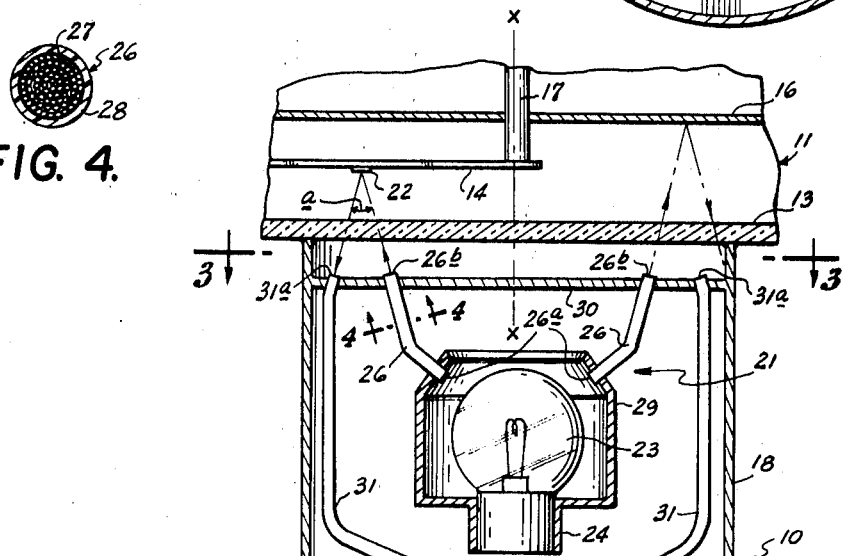
FIG. 2 is an enlarged sectional view taken along the line 2–2 on FIG. 1.

Referring to the drawings in detail, and initially to FIGS. 1 and 2 thereof, it will be seen that a readout device 10 according to this invention is there shown associated with a conventional meter 11 having a housing 12 with a cover glass 13 at the front to permit direct, visual reading of the position of a pointer 14 in relation to a suitably calibrated scale 15 on a dial face 16 (FIG. 2) lying in back of the plane of movement of the pointer. The meter 11 is shown to be of the type in which its pointer 14 is angularly displaced, for example, through an arc of 270°, to move the pointer end along the arcuate scale 15 from its zero to full indication upon similar turning of its supporting shaft 17 in response to variations in the metered condition or physical phenomenon, such as, a liquid level, or a temperature, pressure or the like.

For association with the illustrated meter 11, the readout device 10 is shown to comprise a cylindrical casing 18 having a diameter substantially smaller than that of the arcuate scale 15 so that, when casing 18 is secured at one end to cover glass 13 in alignment with the axis x-x of shaft 17, such casing will not interfere with the direct visual reading of the indication provided by the free end of pointer 14 in cooperation with scale 15. The casing 18 may be secured, at its end, to cover glass 13 by a suitable epoxy resin after axial alignment of the casing with respect to shaft 17 is ensured by a template (not shown) provided for that purpose. Upon setting of the epoxy resin or cement and removal of the locating template, casing 18 may be further secured to meter 11 by means of wires 19 (FIG. 1) which extend at right angles to each other across the forward end of the casing and have their ends wound around, or otherwise secured to the usual screwheads 20 on meter housing 12.

In accordance with this invention, readout device 10 generally comprises means 21 emitting light from casing 18 toward the path of movement of pointer 14 in back of cover glass 13 in a pattern that extends along such path so that, at each position of pointer 14, such light will be reflected, at least by a reflective portion 22 on pointer 14, to pass forwardly through cover glass 13 (FIG. 2).

Figure 3:
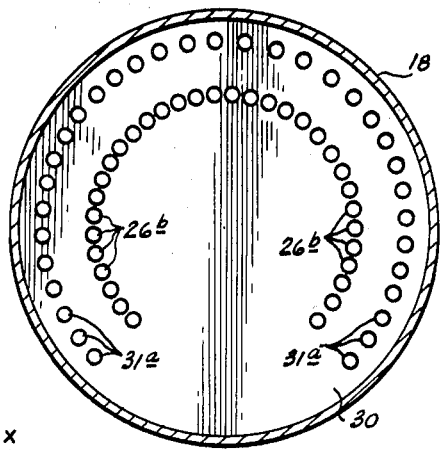
FIG. 3 is a sectional view taken along the line 3–3 on FIG. 2.
Figure 4:
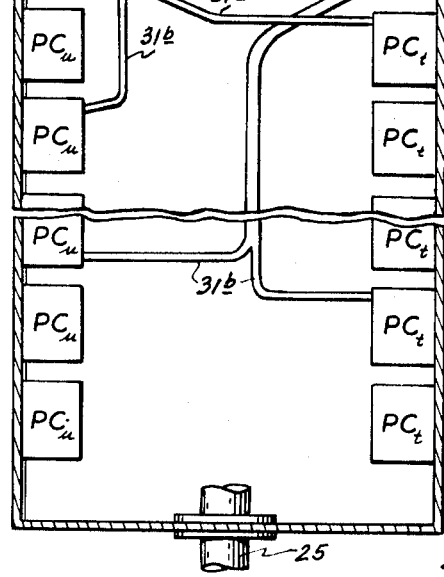
FIG. 4 is a further enlarged detail sectional view taken along the line 4–4 on FIG. 2.

As shown, light emitting means 21 is preferably constituted by a single light source 23 mounted within casing 18 in a holder 24 and being supplied with energizing current from an external supply by way of conductors in a cable 25 extending from casing 18, and a series of elongated light emitting elements 26. Each element 26 is composed of a large number of glass or other light transmitting fibers or filaments 27 bundled together in a flexible plastic sheath 28 (FIG. 4) so that light admitted to fibers 27 at one end of each element 26 will be transmitted therealong irrespective of bends formed in the element and projected longitudinally from the other end of the light emitting element. The ends 26a of elements 26 which are to receive light from source 23 are mounted in a circular array in a annulus 29 extending from holder 24 around source 23 so that such ends simultaneously receive an equal quantum of light energy. The other or light emitting ends 26b of elements 26 are arranged at sequential positions along the path of movement of pointer 14, and particularly of its reflective portion 22. When the path of movement of reflective portion 22 is a circular arc, as shown, the ends 26b of light emitting element 26 are arranged in a concentric similar circular arc (FIG. 3), for example, by being suitably anchored in an annulus or end wall 30 adjacent the end of casing 18 secured to cover glass 13. The arc along which element ends 26b are ranged preferably has a smaller radius than the arcuate path of movement of reflective portion 22, and ends 26b angled outwardly with respect to axis x-x so that light rays emitted from each of ends 26b will pass through cover glass 13 to impinge on, and be reflected from portion 22 or pointer 14 when the latter is at a corresponding position in its arcuate path.

The readout device 10 in accordance with this invention further comprises a series of elongated light receiving elements 31 which may be similar to elements 26 and hence composed of a bundle of light transmitting fibers in a flexible plastic sheath. Ends 31a of elements 31 are arranged at sequential positions along the path of movement of reflective portion 22 of pointer 14 to selectively receive light reflected from portion 22 wen pointer 14 is correspondingly positioned in its path of movement. In the embodiment shown, ends 31a are anchored in annulus or end wall 30 along a circular arc (FIG. 3) which is concentric with, and of larger radius than the arcuate path of reflective portion 22 so that the radial distance between ends 26b and 31a subtend the angle a (FIG. 2) enclosed by light rays from light emitting elements 26 which are incident on reflective portion 22 and reflected from the latter toward light receiving elements 31. In other words, the radial dance between element ends 26b and 31a is equal to two times the produce of the distance between the plane of movement of pointer 14 and the plane of ends 26b and 31a and of the tangent of the angle (a/2) enclosed by the light rays from ends 26b and the normal or perpendicular to the plane of movement of the pointer. Further, each end 31a is angled inwardly with respect to axis x-x, as shown on FIG. 2, so that light rays reflected from reflective portion 22 will be aligned with the axis of each element 31 at its end 31a for optimum transmission by the light receiving element.

By reason of the foregoing, only that element 31 having its end 31a disposed at a position corresponding to that of the pointer 14 will receive light emitted from an element 26 by way of reflection from portion 22 of the pointer, as illustrated at the left-hand side of FIG. 2, and the remaining light emitted from elements 26 will be incident on dial face 16 which, in being spaced rearwardly from the plane of movement of pointer 14, will cause the incident light to travel a longer path and thereby reflect such light forwardly through cover glass 13 to positions spaced radially outward from the ends 31a at positions that do not correspond to that of the pointer, as illustrated at the right-hand side of FIG. 2. It is also preferred that the dial face 16 be of relatively low reflectivity so that light from elements 26 and ambient light will not be strongly reflected therefrom, particularly into element ends 31a. For any position of pointer 14 between its zero and full-scale indications with respect to scale 15, only a correspondingly positioned one of elements 31 will receive reflected, relatively intense light for transmission therealong to indicate the presence of the pointer at such position.

If the position of the meter pointer 14 has to be readout with an accuracy within 1 percent of its actual position, that is, to within 2.7° of its actual position within its 270° arc of movement, this can easily be achieved by providing 100 elements 31 having their ends 31a equally spaced along an arc of 270°. If each element 31 has a diameter of approximately 0.02 inch, then the minimum diameter of the arc of 270° in which the ends 31a of 100 of such elements can be arranged will be approximately 0.84 inch, from which it is clear that casing 18 can readily be provided with a diameter substantially smaller than that of scale 15, as previously indicated to be desirable.

It will be apparent that the reflection of light from portion 22 of pointer 14 to direct light selectively into the end 31a of that element 31 which corresponds to the position of the pointer in no way loads the pointer and thus does not affect either the accuracy with which pointer 14 indicates the metered condition or the speed with which pointer 14 can move to indicate a change in the metered condition. The transmission of light along one of elements 31 corresponds to an "on" condition and indicates the presence of pointer 14 at the corresponding position in relation to scale 15, while the remaining elements 31 do not transmit light and thus are in an "off" condition to indicate the absence of the pointer from the corresponding positions on scale 15.

Figure 5:
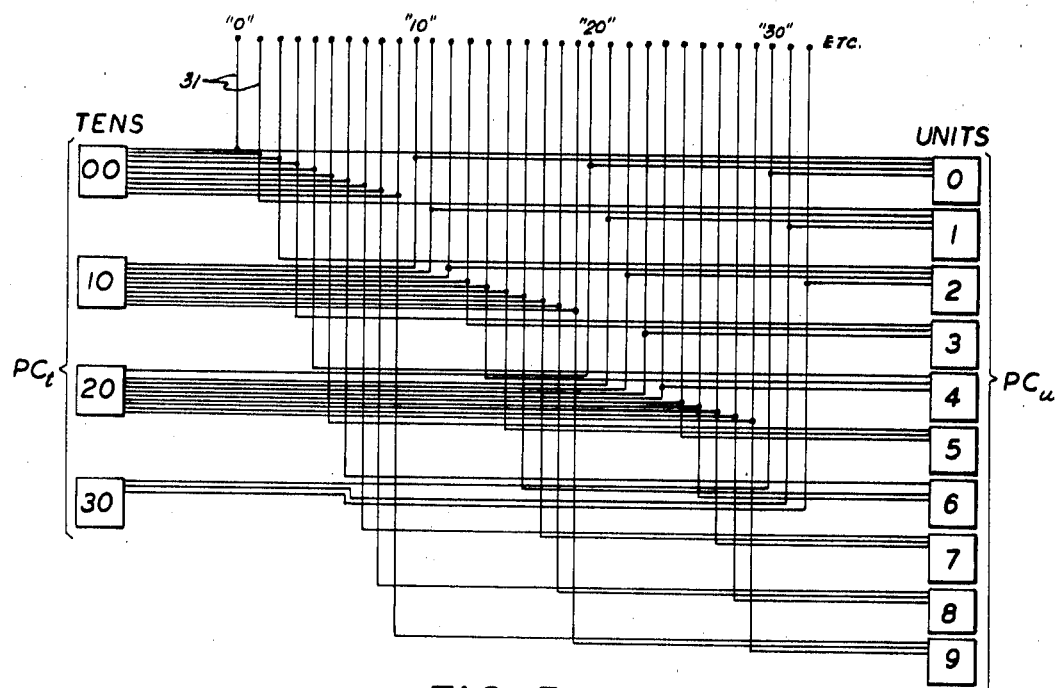
FIG. 5 is a partial schematic view illustrating the connections between optical fiber elements and photocells in the readout device according to this invention.

In accordance with this invention, light receiving elements 31 extend to photocells PC which detect the "on" or "off" condition of the respective light receiving elements, that is, whether such elements 31 are transmitting or are not transmitting light, and correspondingly determine the characteristic of an electrical signal so that such characteristic represents the position of pointer 14. Of course, each of light receiving elements 31 could lead to an individual photocell but, in the case of a readout device having one hundred elements 31, this would require 100 photocells. Since the 100 elements 31 correspond to pointer positions that may be numbered from 0 to 99, inclusive, each of the numbered positions may be represented by a number in the units from 0 to 9 to which there is added a number in the tens from 00 to 90. Similarly, the photocells for association with the 100 elements 31 may be divided into two groups or sets PC and $PC_t$ each having 10 photocells therein and respectively representing units and tens, and each element 31 leads to that one photocell in the units set and that one photocell in the tens set which together represent the number of the pointer position to which that particular element 31 corresponds. For example, as shown in FIG. 5, the elements 31 representing the positions 0 to 9, inclusive, of the pointer are respectively connected to the 0 to 9 $PC_u$ photocells in the units set and each to the 00 $PC_u$ photocell in the tens set; the elements 31 representing the positions 10 to 19 of the pointer are respectively connected to the 0 to 9 $PC_u$ photocells in the units set and each to the 10 $PC_t$ photocell in the tens set; and the remaining elements 31 are similarly each connected to one of the units photocells $PC_u$ and to one of the tens photocells $PC_t$ in accordance with the number of the pointer position to which the element 31 corresponds. Thus, each of the photocells has a cluster of ten elements leading thereto.

The connection of each of light receiving elements 31 to one photocell in the units set and to one photocell in the tens set is easily effected by dividing the bundle of fibers or filaments making up such element 31 into two branches 31b (FIG. 2) which are separately sheathed and lead to the respective photocells in the two sets.

When all of the elements 31 leading to a photocell are in the off or dark condition, such photocell has a relatively high electrical resistance, for example, of 1 M ohm, and such resistance drops, for example, to 10 K ohm, when any one of the elements 31 leading to the photocell is transmitting light thereto, that is, in the on condition. In accordance with this invention, the photocells $PC_u$ and $PC_t$ are included in a signal producing circuit so that an electrical characteristic of the produced signal is determined or varied by 100 increments in dependence upon the described selective illumination of the photocells and the resistance changes therein, thereby to convert the analog meter reading into a digital presentation that can be transmitted to a remote monitoring or data processing station.

Figure 7:
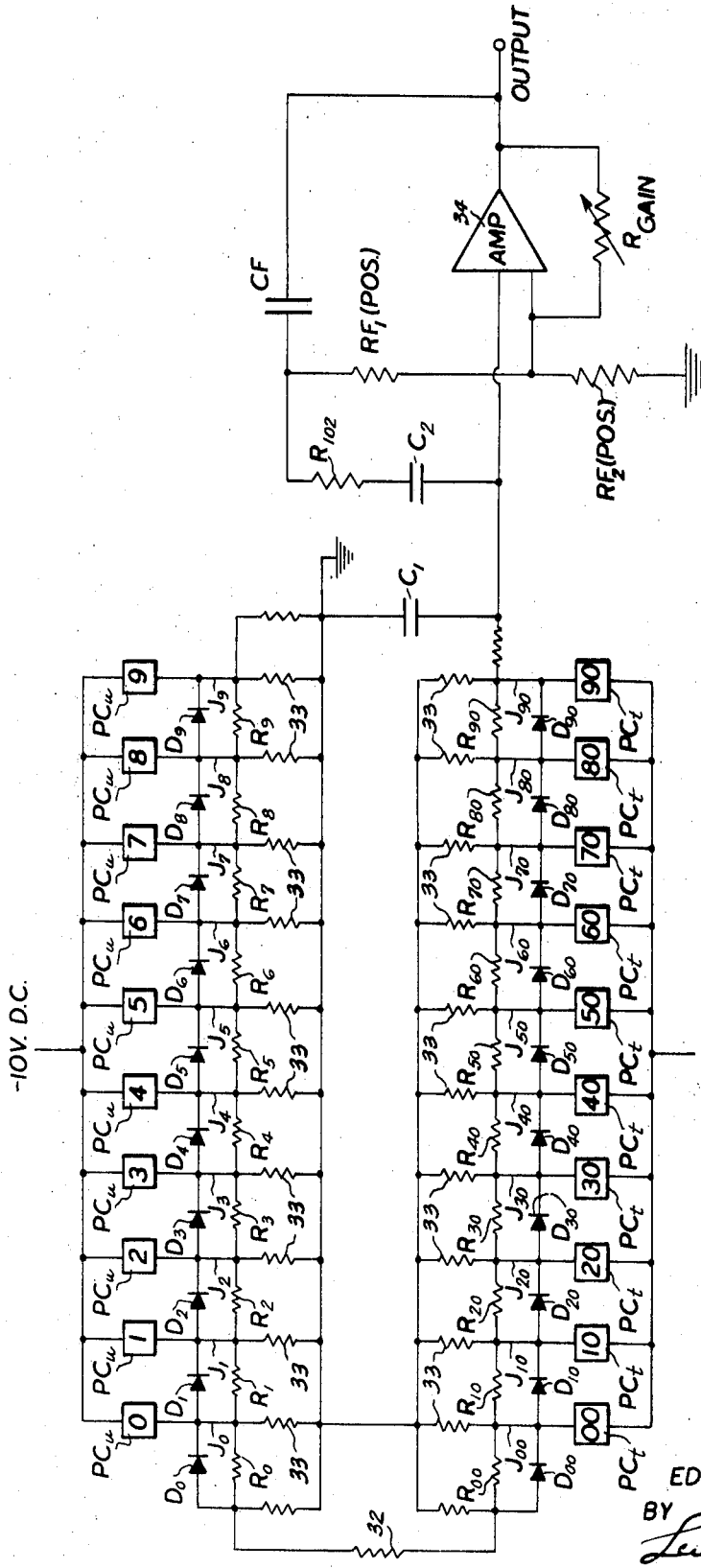
FIG. 7 is a diagrammatic illustration of circuits by which an electrical characteristic of an output signal is varied in accordance with the position of the meter pointer as represented by the illumination of selected photocells.

Referring to FIG. 7, it will be seen that the circuit there illustrated includes two series strings of units resistors $R_o$, $R_1$, $R_2$, $R_3$—$R_9$ and tens resistors $R_{oo}$, $R_{10}$, $R_{20}$, $R_{30}$—$R_{90}$, which strings are connected in series with each other through a resistor 32. The resistors $R_o$—$R_9$ each have a value to represent a unit, and each of the resistors $R_{oo}$—$R_{90}$ is weighted to represent a tens, that is, has a value 10 times that of each unit resistor $R_o$—$R_9$. Connected in parallel with the unit resistors $R_o$—$R_9$ and the tens resistors $R_{oo}$—$R_{90}$ are diodes $D_o$—$D_9$ and diodes $D_{oo}$—$D_{90}$, respectively. The diodes $D_o$—$D_9$ and diodes $D_{oo}$—$D_{90}$, respectively. The diodes $D_o$—$D_9$ are all arranged to conduct current in one direction, that is, in the direction from the end of the respective series string of resistor $R_o$—$R_9$ connected through resistor 32 with the other series string of resistors $R_{oo}$—$R_{90}$. The diodes $D_{oo}$—$D_{90}$ are also arranged to conduct current in one direction away from the end of the respective series string of resistors which is connected with resistor 32, that is, in the direction opposed to the current conducting direction of diodes $D_o$—$D_9$.

The junctions $J_o$—$J_9$ which follow the resistors identified by the corresponding subscripts in the series string of resistors $R_o$—$R_9$ considered in the conducting direction of the respective diodes $D_o$—$D_9$ are connected, at one side, to a source of potential, for example, $-10$ V. DC, through the respective photocells $PC_u$ for units 0 to 9 and, at the other side, to ground through equal resistors 33. Similarly, the junctions $J_{oo}$—$J_{90}$ which follow the resistors identified by the corresponding subscripts in the series string of resistors $R_{oo}$—$R_{90}$ considered in the conducting direction of the respective diodes $D_{oo}$—$D_{90}$ are connected, at one side, to the $-10$ V. DC source through the respective photocells $PC_t$ for tens 00 to 90 and, at the other side, to ground through equal resistors 33. The arrangement is such that illumination of a units photocell $PC_u$ through one of the elements 31 extending thereto causes the resistance values of the associated units resistor and of all other units resistors of lower numerical significance to be substantially switched out of the series string of units resistors and, similarly, the illumination of a tens photocell $PC_t$ causes the resistance values of the associated tens resistor and of all other tens resistors of lower numerical significance to be substantially switched out of the series string of tens resistors. Thus, the total resistance of the two series strings of resistors will be determined by which of the photocells associated with such strings are illuminated, and the resistor 32 will determine the minimum total resistance.

Figure 6:
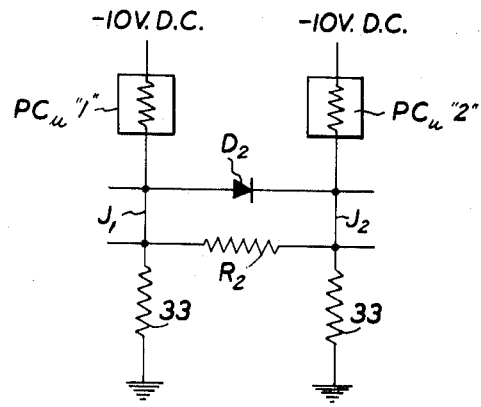
FIG. 6 is a fragmentary diagrammatic view for illustrating the manner in which a resistance value is varied in dependence on illumination of a selected photocell.

The effect of each photocell in substantially "switching out" its associated units or tens resistor and the units or tens resistors of lower numerical significance will now be explained with reference to FIG. 6 which merely illustrates that portion of the circuit of FIG. 7 made up of the units photocells corresponding to the units 1 and 2, the units resistor $R_2$ and the parallel diode $D_2$. For the purpose of this explanation it will be assumed that the circuit components shown have the following typical values:

Photocells $PC_u$ 1 and 2;
$PCR_D$ (resistance when dark)-1 M ohm;
$PCR_2$ (resistance when light or illuminated-10 K ohm.
Resistors $R_2$ and each of the resistors 33 has a value of 1 M ohm.
Diode $D_2$ has an unbiased or no current resistance $R_{D\ N.C.}$ of 10 M ohm, and a resistance value $R_{DC}$ of 50 K ohm when forwardly biased, that is, when current flow therethrough.

When neither of the units photocells 1 and 2 is illuminated, that is, when the meter pointer is not adjacent ends $31a$ of any of the elements 31 extending to such cells, both cells 1 and 2 will have the same relatively high resistance so that junctions $J_1$ and $J_o$ will be at the same potential and no current flows in diode $D_2$. With the typical values given above, the total resistance $R_T$ of the parallel resistor $R_2$ and diode $D_2$ is:

$$R_T = \frac{R_2 \times R_{DNC}}{R_2 + R_{DNC}} = .909M \text{ ohm}$$

This resistance value $R_T$ will be further modified by the twin resistance paths through resistors 33 and through the photocells 1 and 2 and will approach a final value of 0.5 M ohm. thus, $J_1$ and $J_2$ will be established at a potential of $-5.0$ VDC with a source resistance of 0.5 M ohm.

When units photocell 2 is illuminated by light from an element 31 extending thereto, and has its electrical resistance PCRL reduced to 10 K ohm., the potential at $J_2$ will change to:

$$E_{J2} = -10\frac{10^6}{10^6 + 10^4} = -9.9V$$

Thus, the potential at $J_2$ will have a larger negative value than the potential at $J_1$ and diode $D_2$ will be forwardly biased, that is, current will flow from $J_1$ to $J_2$ establishing a potential difference between $J_1$ and $J_2$ of approximately 0.5V. Thus, if $J_2$ has a potential of $-9.9V$, the potential at $J_1$ will be $-9.4V$.

The voltage-current relationship on diode $D_2$ will establish the effective resistance value $R_{DC}$ thereof of 50 K ohm. Hence, the resultant $R_{T1}$ of the resistance value of resistor $R_2$ and of the conducting resistance of diode $D_2$, in parallel, will be:

$$R_{T1} = \frac{R_2 \times R_{DC}}{R_2 + R_{DC}} = 45K \text{ ohm (approx.)}$$

Thus, when photocell 2 is dark or does not receive light from an associated element 31, its related resistor $R_2$ has an effective value of 500 K ohm, and such effective value is switched out or reduced to less than 50 K ohm upon illumination or impingement of light on photocell 2.

It will be apparent that, when the potential at junction $J_1$ is reduced from the normal value of $-5.0$ V to $-9.4$ V, as described above, the result is to forwardly bias diode $D_1$ and cause current flow therethrough from the relatively higher potential at junction $J_o$ (FIG. 7) to the reduced potential at $J_1$, and such current flow through diode $D_1$ similarly reduces the resultant resistance of resistor $R_1$ and diode $D_1$, in parallel, from approximately 500 K ohm to less than 50 K ohm. Thus, when any one of units photocells $PC_u$ 0 to 9 has light impinging thereon, there is an effective resistance reduction of approximately 450 K ohm for the associated units resistor and for each units resistor signifying a lower unit. For example, if units photocell $PC_u$ 6 has light directed thereto by an associated element 31, the effective resistance of resistor $R_6$ will be reduced from 500 K ohm. to less than 50 K ohm, and the effective resistance of each of resistors $R_o$ to $R_5$, inclusive, will be similarly reduced by approximately 450 K ohm. Since the effective resistance of resistor $R_o$ is reduced by 450 K ohm when units photocell $PC_u$ 0 is illuminated, the resistance change resulting from illumination of photocell $PC_u$ 6, as compared with illumination of photocell $PC_u$ 0, is 6×450 K ohm, that is, a change of 2.7 M ohm. further, it will be apparent that, as pointer 14 moves past ten successive positions, the total resistance of the series string of resistors $R_o$—$R_9$ will change in increments of 450 K ohm.

As previously mentioned, each of the tens resistors $R_{oo}$—$R_{90}$ is weighted to correspond to the total resistance of the resistors $R_o$—$R_9$ in the units string. Thus, for the values given above, the illumination of each of the tens photocells $PC_t$ will result in a reduction of the effective resistance of its associated resistor and of each of the tens resistors signify all lower tens by 4.5 M ohm. For example, if tens photocell $PC_t$ 30 is illuminated, the resistance of the associated resistor $R_{30}$ and of each of the lower resistors $R_{20}$, $R_{10}$, and $R_{oo}$ in the same series string will be reduced by 4.5 ohm for a total resistance reduction of 13.5 M ohm as compared with the total resistance of the tens string when the photocell $PC_t$ 00 is illuminated.

Since the diodes $D_{oo}$—$D_{90}$ in the tens string are conductive in the direction opposed to the conductive direction of the diodes $D_o$—$D_9$ in the units string, it will be apparent that the illumination of a photocell associated with one string cannot influence the flows of current in the diodes of the other string.

Further, it will be apparent that, at any time, the total resistance of the units and tens strings of resistors $R_0$—$R_9$ and $R_{00}$—$R_{90}$ corresponds to the position of pointer 14 and to the element 31 which receives reflected light from such pointer for transmission to that one of the units photocells and to that one of the tens photocells which together represent the pointer position.

It will be apparent that the incremental change in the total resistance of the series strings in correspondence with the positional change of the meter pointer may be readily employed to vary any desired characteristic, for example, frequency, voltage, etc. of a produced electrical signal for transmission to a remote station at which the meter reading is to be monitored, recorded or subjected to data processing procedures.

In the arrangement of FIG. 7, the total resistance of the series strings of units and tens resistors $R_0$—$R_9$ and $R_{00}$—$R_{90}$ is used to vary the resistance of an RC oscillator and thereby determine the output frequency of the oscillator. Such RC oscillator is preferably a Wien Bridge Oscillator which desirably exhibits very stable frequency operation because of the nature of its feedback circuit. As shown, the strings of units and tens resistors are connected in parallel with a capacitor $C_1$ to form a parallel RC network which is connected to the gate at a field effect transistor (not shown) constituting the input to an electronic amplifier 34. A series RC network constituted by a resistance $R_{102}$ and a capacitor $C_2$ is also connected to such input to amplifier 34. These parallel and series RC networks together with the illustrated feedback networks CF $RF_1$, $RD_2$ and $R_{Gain}$ around the amplifier loop form a conventional Wien Bridge Oscillator. The series and parallel RC networks form a high pass and low pass filter whose corner frequency is fixed by the R and C values of such networks. This arrangement provides a frequency feedback which has a narrow pass frequency, and the voltage feedback controls the amplitude of oscillation. Both the frequency and voltage feedback circuits are positive thus initiating oscillations. In addition to such positive feedback circuits, there is provided a negative feedback loop to ensure that overdrive is now applied.

Thus, the output obtained from the Wien Bridge Oscillator has a frequency which is dependent upon the total resistance of the series strings of units and tens resistors, that is, the resistance in the parallel RC network, and the range of such frequency, which obviously corresponds to the position of pointer 14, may be varied, by simultaneously changing the values of $C_1$ and $C_2$, so as to make the output of the oscillator suitable for transmission to a remote station, for example, by way of usual telephone lines.

It will be apparent in the foregoing description of readout device 10 that the operation thereof is predicated on the on-off, that is, digital variation of the light intensity in the elements 31. In other words, each unit variation in the reading of meter 11 discontinues the transmission of light by one of elements 31 and initiates the transmission of light by another of such elements 31, and this, inturn, causes corresponding change in the condition of associated photocells. The speed with which such changes in the conditions of the photocells may occur is practically limited only by the speed of movement of the meter pointer 14, as the readout device 10 itself has an upper change frequency limitation of approximately 50 kilohertz.

A digital response is obtained from the readout device 10 as it has a finite number of light receiving elements 31 for detecting the position of the meter pointer. Having obtained a digital output from the photocells, which output is related to the position of the meter pointer or other movable member being read, the format to be generated by the output of the photocells is selected in dependence upon the speed, accuracy, repeatability and complexity of the movement being read. Thus, the format for the information to be transmitted may be of low sinusoidal frequency, as in the embodiment described in detail herein, low or high frequency carrier modulation, time differential, digital code, pulse width modulation, high sinusoidal frequency and multiple modes. The format selected for the information to be transmitted of course determines the means by which such transmission may be effected. For example, where the low sinusoidal frequency, low frequency carrier modulation or time differential format is selected, transmission can be by telephone line. However, where the digital code, pulse width modulation or multiple mode is the selected format, transmission by coaxial cable is required. Transmission may also be ny radio frequency transmission, microwave transmission, power lines, laser beam or any other means employed for information transmittal.

Although a particular embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

I claim:

1. A readout device for optically sensing the position of an indicator member movable in a predetermined path and for producing an electrical signal corresponding to the sensed position, comprising means emitting light along the length of said path, a plurality of light receiving element each composed of light transmitting fibers and having first ends thereof arranged at sequential positions adjacent to the length of said path to selectively receive light from said light emitting means by way of said indicator member when the latter is at corresponding positions in said path, a plurality of photocells having the other ends of said light receiving elements extending thereto so as to be selectively illuminated when said member is disposed at said positions corresponding to the associated light receiving elements, and signal producing circuit means including said photocells to determine an electrical characteristic of the produced signal in dependence upon the selective illumination of said photocells and hence according to the position of said indicator member.

2. A readout device according to claim 1, in which said light emitting means and said first ends of the light receiving elements are disposed at the same side of said path, and at least a portion of said indicator member is reflective so that, in each of said positions of the indicator member, said portion thereof reflects light from said light emitting means into the correspondingly positioned first end of a light receiving element.

3. A readout device according to claim 2, in which said light emitting means includes a light source and a series of light emitting elements each composed of light transmitting fibers and having first ends simultaneously and equally receiving light from said source and their other ends directed toward said path and arranged sequentially therealong.

4. A readout device according to claim 3, in which said indicator member is a meter pointer movable in said path, and said path is in a plane between a coplanar dial face and cover glass, and said light emitting and light receiving elements respectively emit and receive light through said cover glass.

5. A readout device according to claim 4, in which said first ends of the light receiving elements are spaced from said other ends of the light emitting elements in directions transverse to said path by distances that substantially subtend an angle enclosed by light rays incident on said reflective portion from said light emitting elements and reflected from said portion toward said light receiving elements.

6. A readout device according to claim 4, in which said pointer is movable angularly so that said path of its reflective portion is a circular arc and said first ends of the light receiving elements and said other ends of the light emitting elements are arranged in similar areas of larger and smaller radii and then the radius of said path so as to be spaced radially by distances that substantially subtend an angle enclosed by light rays from said light emitting elements incident on said reflective portion and reflected from the latter toward said light receiving elements, whereby light rays from said light emitting elements impinging on said dial face are reflected radially away from said first ends of the light receiving elements.

7. A readout device according to claim 6, in which said reflective portion of the pointer is spaced radially inward from a free end of the pointer which cooperates with a scale on said dial face for visually indicating the position of said pointer, and said light source, light emitting and light receiving elements and photocells are contained in a cylindrical casing which is secured to said cover glass and diametrically dimensioned to be radially inside said scale, whereby to avoid interference with direct visual reading of the position of the pointer.

8. A readout device according to claim 4, in which said dial face is of relatively low reflectivity.

9. A readout device according to claim 1, in which there are at least two sets of said photocells and said other end of each light receiving element extends to a respective photocell in each of said sets, whereby the number of said light receiving elements and of said positions of the member that can be discriminately sensed is the product of the numbers of said photocells in said sets.

10. A readout device according to claim 1, in which said circuit means includes a series arrangement of resistance elements connected with said photocells so as to have the resistance values thereof selectively switched out of said series arrangement in turn upon selective illumination of said photocells, whereby the total resistance of said series arrangement corresponds to the position of said indicator member, and means to vary said electrical characteristic of the signal in accordance with changes in said total resistance.

11. A readout device according to claim 10, in which said circuit means includes an RC oscillator having said signal as the output thereof, and said total resistance of the series arrangement constitutes a resistance component of the oscillator, whereby the frequency of said output is the electrical characteristic of the signal which is varied according to the position of said indicator member.

12. A readout device according to claim 1, in which said circuit means includes resistance elements associated with said photocells and each having a diode in parallel therewith to freely conduct current in one direction so that the resistance effect of each resistance element is substantially eliminated when current flows in the respective diode, said resistance elements and parallel diodes are connected in at least one series string, a source of electrical potential is applied to junctions between successive resistance elements through said associated photocells so that, upon illumination of a selected photocell corresponding to the position of said member, the potential at the corresponding junction is varied in relation to the potentials at the other junctions to cause current to flow through all of the diodes which are between said corresponding junction and one end of said series string for effectively eliminating from the total resistance of said string those resistance elements in parallel with the current conducting diodes, the values of said resistance element are selected to correspond to increments of movement of said member between said positions thereof, and means to vary said electrical characteristic of the signal in accordance with changes in said total resistance of the series string.

13. A readout device according to claim 12, in which there are first and second sets of said photocells each having resistance elements and diodes associated therewith in respective series strings as aforesaid, said series strings are connected with each other in series, the diodes in one of said series strings are conductive in the direction opposed to that in which the diodes of the other series string are conductive so that the diodes of each of said strings are uninfluenced by the state of the diodes in the other string, the value of each resistance element associated with a photocell of said second set is substantially equal to the sum of the values of the resistance elements associated with the photocells of said first set, and said other end of each light receiving element extends to a respective photocell in each of said first and second sets, whereby the number of positions of said member that can be discriminately sensed is the product of the numbers of said photocells in said first and second sets.

14. In combination with a meter having a pointer with a reflective portion movable in a predetermined path lying in a plane which is between a parallel dial face and cover glass to provide, a visual indication of a condition sensed by the meter: a readout device for providing an electrical signal corresponding to said visual indication and suitable for transmission to a remote station, said readout device comprising a casing secured against said cover glass of the meter, means emitting light from said casing through said cover glass toward said path along the length of the latter so as to be reflected back through said glass by said reflective portion of the pointer only at the position of the pointer, a series of light receiving elements in said casing each composed of light transmitting fibers and having first ends thereof arranged in sequence to selectively receive the light reflected through said glass from said reflective portion of the pointer when the latter is at corresponding positions in said path, a plurality of photocells in said casing having the other ends of said light receiving elements extending thereto so as to be selectively illuminated only when said pointer is disposed at the positions corresponding to the associated light receiving elements, and signal producing circuit means having said photocells included therein to determine an electrical characteristic of the produced signal in dependence on the illumination of said photocells and hence according to said visual indication.

15. The combination according to claim 14, in which said pointer is movable angularly so that said path is a circular arc, said light emitting means includes a light source and a series of light emitting elements each composed of light transmitting fibers and having first ends equally receiving light from said source and their other ends directed toward said cover glass and arranged in sequence, said sequentially arranged first ends of the light receiving elements and other ends of the light emitting elements lying along similar arcs of larger and smaller radii than said arc of the path so as to be spaced apart radially by a distance that substantially subtends the angle at which light rays from said light emitting elements are reflected by said reflective portion of the pointer.

16. The combination according to claim 15, in which said scale is traversed by a free end of said pointer from which said reflective portion is substantially spaced, and said casing is disposed radially inward with respect to said pointer end and scale to permit reading of said visual indication with said casing secured against the cover glass.

17. The combination according to claim 14, in which said dial face is of relatively low reflectivity.

18. The combination according to claim 14, in which there are at least two sets of said photocells and said other end of each light receiving element extends to a respective photocell in each of said sets, whereby the number of said light receiving elements and of said positions of the pointer that can be discriminately sensed is the product of the numbers of said photocells in said sets.

19. The combination according to claim 14, in which said circuit means includes a series arrangement of resistance elements connected with said photocells so as to have the resistance values thereof selectively switched out of said series arrangement in turn upon selective illumination of said photocells, whereby the total resistance of said series arrangement corresponds to the position of said indicator pointer, and means to vary said electrical characteristic of the signal in accordance with changes in said total resistance.